(12) United States Patent
Pfadenhauer

(10) Patent No.: US 12,496,866 B2
(45) Date of Patent: Dec. 16, 2025

(54) MOTOR VEHICLE

(71) Applicant: Dr. Ing. h.c. F. Porsche Aktiengesellschaft, Stuttgart (DE)

(72) Inventor: Michael Pfadenhauer, Weil der Stadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 46 days.

(21) Appl. No.: 18/428,497

(22) Filed: Jan. 31, 2024

(65) Prior Publication Data
US 2024/0326539 A1 Oct. 3, 2024

(30) Foreign Application Priority Data
Mar. 29, 2023 (DE) .................. 10 2023 107 955.7

(51) Int. Cl.
*B60G 17/005* (2006.01)
*B62D 21/11* (2006.01)

(52) U.S. Cl.
CPC ............ *B60G 17/005* (2013.01); *B62D 21/11* (2013.01); *B60G 2204/15* (2013.01); *B60G 2204/418* (2013.01); *B60G 2204/46* (2013.01)

(58) Field of Classification Search
None
See application file for complete search history.

(56) References Cited

U.S. PATENT DOCUMENTS

| 5,513,875 A * | 5/1996 | Tahara ..................... B60G 9/02 |
| | | 280/124.112 |
| 7,357,402 B2 * | 4/2008 | Berghus ................. B60G 13/18 |
| | | 280/124.109 |
| 7,784,812 B1 * | 8/2010 | Lares ..................... B62D 12/00 |
| | | 180/14.4 |
| 11,213,441 B2 * | 1/2022 | Goertzen ............. B60G 17/056 |
| 2002/0125676 A1 * | 9/2002 | Bryant ................ B60G 11/181 |
| | | 280/124.179 |
| 2002/0170755 A1 | 11/2002 | Cope |

(Continued)

FOREIGN PATENT DOCUMENTS

| DE | 3719327 C2 | 9/1990 | |
| DE | 19727819 A1 * | 1/1999 | ............ B60G 17/02 |
| DE | 10329037 A1 * | 1/2005 | ............ B60G 13/16 |

(Continued)

*Primary Examiner* — Nicole T Verley
(74) *Attorney, Agent, or Firm* — Buchanan Ingersoll & Rooney PC

(57) ABSTRACT

A motor vehicle with a chassis which has at least two axles. A subframe is associated with one of the axles and is connected to the chassis and on which the at least two wheels of the respective axle are each mounted and held by way of a single-wheel suspension, and with at least one bearing device for elastically connecting the subframe to the chassis, which permits relative movements between the subframe and the chassis. A balancing between comfort and performance can be improved with at least one connection device for rigidly connecting the subframe to the chassis, which is switchable between an open state in which the connection device permits relative movements between the subframe and the chassis, and a closed state in which the connection device prevents relative movements between the subframe and the chassis.

10 Claims, 1 Drawing Sheet

(56) References Cited

U.S. PATENT DOCUMENTS

2015/0102568 A1* 4/2015 Slawson ................ B60G 17/00
           280/5.514
2018/0233126 A1   8/2018 Zafeiropoulos

FOREIGN PATENT DOCUMENTS

| DE | 10330877 A1 | 1/2005 | |
|---|---|---|---|
| DE | 102016104323 A1 | 9/2017 | |
| DE | 102004022167 B4 | 10/2017 | |
| DE | 102023107955 A1 * | 10/2024 | ........... B60G 17/005 |
| EP | 0991535 B1 * | 11/2001 | |
| EP | 2251217 B1 | 4/2018 | |
| WO | WO-2005001308 A1 * | 1/2005 | ............. B60G 13/16 |
| WO | WO-2009156769 A1 * | 12/2009 | ............. B60G 11/18 |

* cited by examiner

MOTOR VEHICLE

CROSS-REFERENCE TO RELATED APPLICATION

This application claims priority to German Patent Application No. 10 2023 107 955.7, filed Mar. 29, 2023, the content of such application being incorporated by reference herein in its entirety.

FIELD OF THE INVENTION

The present invention relates to a motor vehicle, in particular to a passenger car.

BACKGROUND OF THE INVENTION

A motor vehicle typically comprises a chassis having at least two axles each with at least two vehicle wheels, wherein the at least two axles form at least one front axle with at least two front wheels and one rear axle with at least two rear wheels. Furthermore, a motor vehicle can be equipped with at least one subframe associated with one of the axles. The subframe is connected to the chassis. The two wheels of the respective axle are each supported and held on the subframe by means of a single-wheel suspension system. The chassis typically supports a vehicle body or forms an integral part of the body if the body is self-supporting. The vehicle typically has a vehicle interior in which at least one vehicle seat is located for a driver (male/female/non-binary) or for a passenger (male/female/non-binary).

During vehicle operation, driving sounds typically occur, of which road sounds and/or wheel rolling sounds form a significant component. In order to reduce the wheel rolling sounds component in the vehicle interior, it is possible, in principle, to connect the subframe to the chassis elastically, for example, using elastokinematic bearings. However, an elastic coupling between the subframe and the chassis is generally disadvantageous for the driving dynamics and/or performance of the vehicle. For a particularly good performance, a rigid connection between the subframe and the chassis is therefore preferred. However, the rigid connection between the subframe and the chassis conducts wheel rolling sounds virtually undamped from the wheels to the vehicle interior. A rigid connection differs from an elastic connection in the size of the possible relative mobility between the subframe and the chassis. While the elastic connection permits relative movements to a certain, predetermined extent, these are virtually no longer possible with the rigid connection. The rigid connection corresponds in this respect to a firm connection or fixation, whereas the elastic connection then corresponds to a movable connection. It is also clear that a rigid connection can also be elastic due to an intrinsic elasticity of the connection partners and the connecting elements used, but to a significantly lesser extent than an elastic connection.

A reduction of the wheel rolling sounds can be realized, for example, using an acoustic noise attenuation device which generates antinoise and radiates it into the vehicle interior. For the driver and/or passenger, the wheel rolling noise is thereby significantly reduced, which improves their comfort level.

The present invention therefore addresses the problem of providing an improved, or at least another, embodiment for a motor vehicle of the above-described type, which is characterized in particular by an improved balancing of comfort and performance.

A single-wheel suspension is known from EP 2 251 217 B1, which is incorporated by reference herein, in which a suspension link which connects a wheel support to the chassis via elastic bearings is provided with a stiffness adjustment device. In this way, track characteristics that affect tire loading can be influenced.

A motor vehicle is known from DE 10 2004 022 167 B4, which is incorporated by reference herein, the rear axle of which is supported with a subframe on the chassis, wherein support elements are used, with the help of which a rotational adjustment of the subframe relative to the chassis is possible about a vertical axis of rotation.

A single-wheel suspension is known from DE 37 19 327 C2, which is incorporated by reference herein, which comprises suspension links for pivotally connecting vehicle wheels to the chassis, wherein the suspension links are connected to the chassis via elastic bearings. Using an adjustment device, the bearing characteristics of the elastic bearings can be adjusted as a function of acquired travel conditions.

SUMMARY OF THE INVENTION

The invention relates to the general concept of elastically connecting the subframe to the chassis, wherein this elastic connection can be blocked as needed to create a rigid connection between the subframe and the chassis. The vehicle can thus be operated on a demand-dependent basis or optionally with a high level of comfort with reduced wheel rolling sounds in the vehicle interior when the subframe is elastically connected to the chassis, or can be operated with a high performance when the subframe is rigidly connected to the chassis.

In detail, the invention proposes that the motor vehicle is equipped with at least one bearing device for elastically connecting the subframe to the chassis, which permits relative movements between the subframe and the chassis. In addition, the motor vehicle is equipped with a connection device for rigidly connecting the subframe to the chassis, said connection device being switchable between an open state in which the connection device permits relative movements between the subframe and the chassis, and a closed state in which the connection device prevents relative movements between the subframe and the chassis, i.e. rigidly connects the subframe to the chassis. In other words, the respective bearing device provides for the elastic connection between the chassis and the subframe, while, with the aid of the respective connection device, this elastic connection between the subframe and chassis is permitted and/or activated or blocked and/or deactivated, as needed.

Modern motor vehicles offer the vehicle driver the ability to select between different modes of operation, such as, for example, between a standard mode of operation, a comfort mode of operation, a sports mode of operation, and an economy mode of operation. For example, for the sports mode of operation, the connection device can be switched into the closed state to deactivate the elastic connection between the subframe and the chassis. For all other modes of operation, however, it can be provided that the connection device is switched into the open state in order to activate the elastic connection between the subframe and the chassis.

Typically, the motor vehicle has a vehicle interior in which at least one vehicle seat is located for a driver and/or for a passenger. According to an advantageous embodiment, the motor vehicle can optionally be equipped with an acoustic noise attenuation device that attenuates driving sounds, in particular wheel rolling sounds, of the motor vehicle in the vehicle interior by means of antinoise. With the aid of the noise attenuation device, the noise development in the vehicle interior can be reduced, especially when the elastic connection is deactivated, e.g. for a sports mode of operation, so that a high level of comfort can be achieved at the same time, even at high performance. In addition, with the aid of the noise attenuation device, with the elastic connection active, for example, for a comfort mode of operation, the ride comfort can additionally be increased.

According to an advantageous embodiment, the motor vehicle can have a control device which is coupled to the connection device and to the noise attenuation device and which is also configured such that it switches on the noise attenuation device when the connection device is switched to the closed state and switches off the noise attenuation device when the connection device is switched to the open state. With this measure it can be achieved that the comfort level is not, or only slightly, reduced for the respective driver and/or passenger when the vehicle operation is switched, for example, from the comfort mode of operation to the high performance sports mode of operation.

According to an advantageous embodiment, the connection device can be configured as a locking device comprising at least one latch, which is adjustable between a locking position and an unlocking position by means of a latch actuating device. In the locked state, the respective latch assumes its locking position, in which the respective latch engages in a latch receptacle complementary thereto and thereby generates a positive locking connection, which rigidly connects the subframe to the chassis. In the open state, on the other hand, the respective latch assumes its unlocking position, in which the respective latch is moved out of the associated latch receptacle, so that the subframe is movable relative to the chassis.

It is therein possible, in principle, to arrange the respective latch to be adjustable on the subframe while the associated latch receptacle is fixedly arranged on the chassis. Alternatively, the respective latch can be adjustably arranged on the chassis, while the associated latch receptacle is fixedly arranged on the subframe.

In another advantageous embodiment, the bearing device can comprise multiple elastokinematic bearings, each of which elastically connects the subframe to the chassis. Such elastokinematic bearings can be configured as rubber bearings having pneumatic and/or hydraulic damping.

Suitably, the locking device can expediently comprise multiple latches, wherein in each case each latch is associated with an elastokinematic bearing having the associated latch receptacle. In the locking position, the respective latch can engage in the latch receptacle and thus block the associated bearing so that it connects the subframe rigidly to the chassis. Further, in the unlocking position, the respective latch can be moved out of the latch receptacle and release the associated bearing, so that it connects the subframe elastically to the chassis.

According to an advantageous embodiment, the connection device can bring about the locked state mechanically and/or hydraulically and/or pneumatically and/or magnetically and/or electrically. In doing so, it can work with a positive locking mechanism or with an interlocking mechanism or with a friction locking mechanism to realize the locked state.

In another embodiment, the connection device can be integrated into the bearing device such that the bearing device is switchable between an elastic bearing device state and a rigid bearing device state. The elastic bearing device state therein forms the open state of the connection device in which the bearing device elastically connects the subframe to the chassis and permits relative movements between the subframe and the chassis. In contrast thereto, the rigid bearing device state forms the locked state of the connection device in which the bearing device rigidly connects the subframe to the chassis and prevents relative movements between the subframe and the chassis. The integration of the connection device into the bearing device reduces the design intervention in the motor vehicle, which simplifies the realization of the motor vehicle disclosed herein. It is conceivable, for example, that the bearing device is equipped with at least one hydraulic bearing that operates with an electrorheological liquid, the viscosity of which can be sharply altered by means of an electrical field. The bearing device can thus be switched between an elastic operating mode in which it functions as an elastic bearing device and a rigid operating mode in which it functions as a rigid connection device.

The bearing device can suitably have multiple bearings, each being switchable at least between an elastic bearing state, in which the respective bearing elastically connects the subframe to the chassis and thus permits relative movements between the subframe and the chassis, and a rigid bearing state, in which the respective bearing rigidly connects the subframe to the chassis and thus prevents relative movements between the subframe and the chassis. Accordingly, the bearing device assumes its elastic bearing device state when the bearings are switched to the elastic bearing state. In contrast thereto, the bearing device assumes its rigid bearing device state when the bearings are switched to the rigid bearing state. In this configuration, the integration of the connection device into the bearing device is carried out by integrating the functionality of the connection device into the bearings of the bearing device. Such an embodiment can be particularly easily integrated into an existing design of the motor vehicle.

The axle associated with the subframe can be a driven axle of the vehicle such that the subframe carries a drive motor for propelling the wheels disposed on this axle. The drive motor can be an internal combustion engine or an electric motor.

In another embodiment, it can be provided that each of the axles is equipped with a subframe of this type which is connected to the chassis via a bearing device of this type and a connection device of this type. It is also conceivable that, in a vehicle having exactly two axles, only one of the axles is equipped with such a subframe.

Further important features and advantages of the invention are disclosed in the claims, the drawings, and the accompanying description making reference to the drawings.

It should be understood that the features specified above and those described below can be used not only in the respectively specified combination, but also in other combinations or on their own, without departing from the scope of the invention as defined by the claims. The components described above and referred to below of a higher-level unit, e.g., a device, an apparatus, or an assembly, which are indicated separately, can constitute separate parts and/or components of this unit, or integral regions and/or portions of this unit, even if the drawings show otherwise.

Preferred embodiment examples of the invention are represented in the drawings and are explained in further detail in the description below, wherein identical reference numbers refer to identical, similar, or functionally identical components.

DETAILED DESCRIPTION OF THE INVENTION

Figure 1:
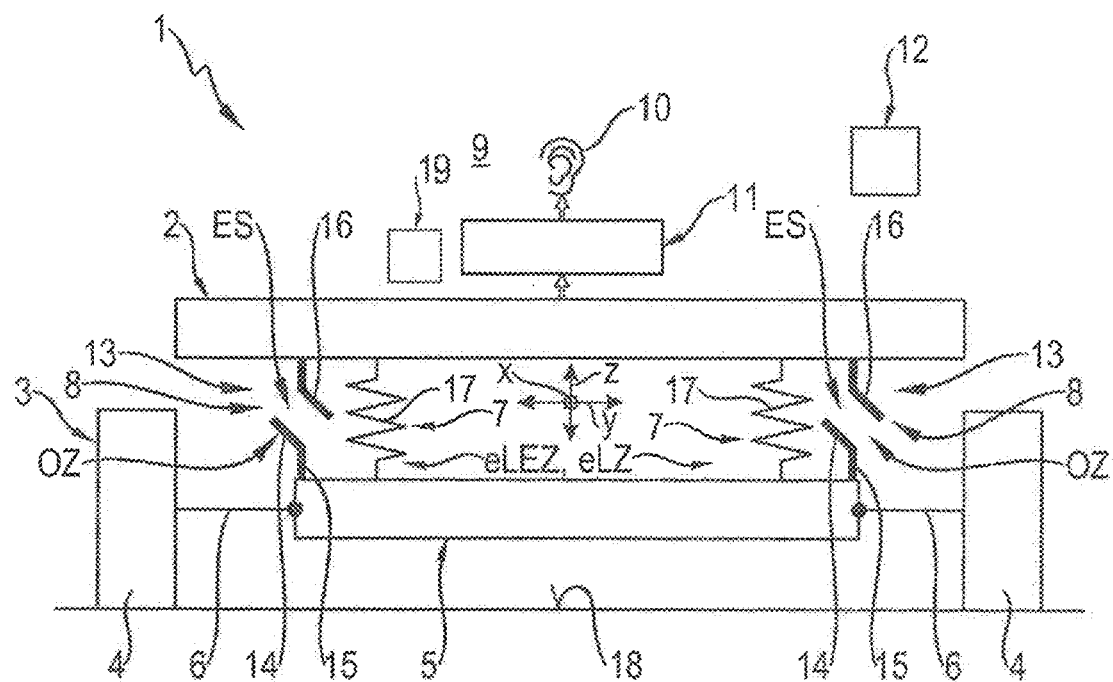
FIG. 1 shows a highly simplified schematic representation of the principle of a motor vehicle in the region of an axle in a first state with an elastic connection between a subframe and a chassis.
Figure 2:
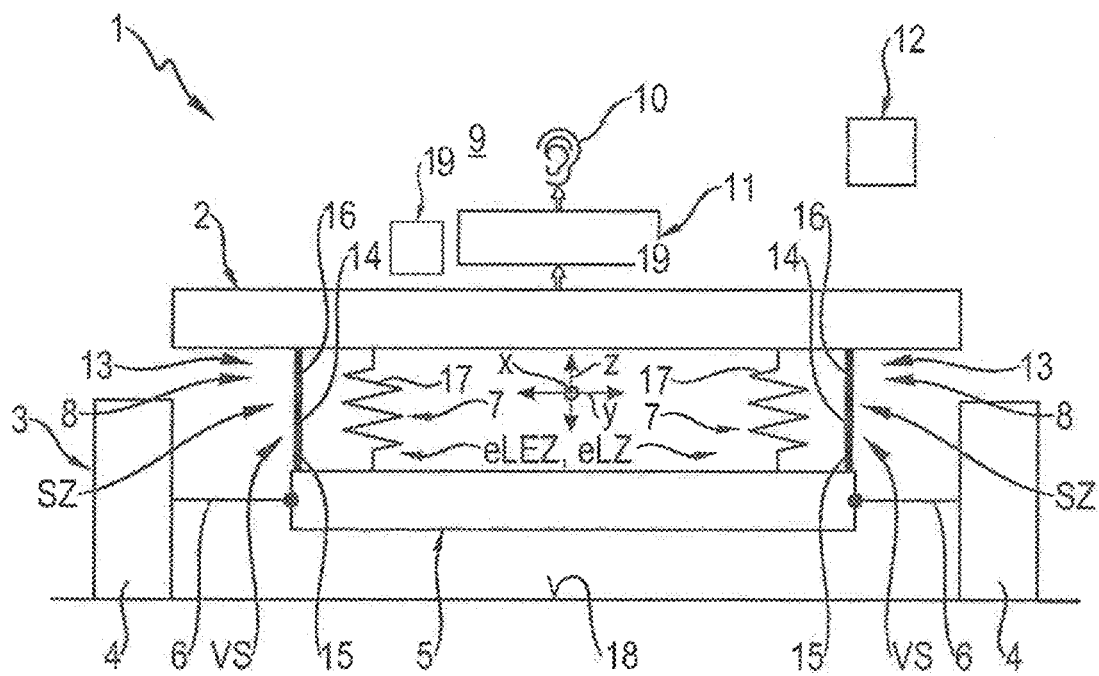
FIG. 2 shows a view as in FIG. 1, but in a second state with a rigid connection between the subframe and the chassis.

According to FIGS. 1 and 2, a motor vehicle 1, which can preferably be a passenger vehicle, has a chassis 2 which comprises at least two axles 3, each with at least two vehicle wheels 4 which are supported on a roadway 18 on which the motor vehicle 1 stands or travels. However, only one of the two axles 3 can be seen in FIGS. 1 and 2. The two axles 3 can form a front axle with at least two front wheels and a rear axle with at least two rear wheels.

The motor vehicle 1 typically has a vehicle longitudinal direction X, a vehicle transverse direction Y, and a vehicle height direction Z that extend perpendicularly to each other. In FIGS. 1 and 2, the vehicle longitudinal direction X is perpendicular to the drawing plane, while the vehicle transverse direction Y extends horizontally and the vehicle height direction Z extends vertically.

The vehicle 1 also comprises at least one subframe 5, which is associated with one of the two axles 3. The subframe 5 is connected to the chassis 2. The two wheels 4 of the respective axle 3 are supported and held on the subframe 5, each by means of a single-wheel suspension 6, which is symbolically indicated here in an extremely simplified manner by a transverse link. It is clear that the respective single-wheel suspension 6 can typically comprise further suspension links and, in addition, a spring-damper element for support on the chassis 2.

The vehicle 1 is also equipped with at least one bearing device 7, which serves to elastically connect the subframe 5 to the chassis 2 and permits the relative movements between the subframe 5 and the chassis 2. These relative movements can be in the vehicle longitudinal direction X and/or in the vehicle transverse direction Y and/or in the vehicle height direction Z. Furthermore, the vehicle 1 is equipped with at least one connection device 8, which is used to rigidly connect the subframe 5 to the chassis 2. The connection device 8 can be switched between an open state OS as shown in FIG. 1, and a closed state SZ as shown in FIG. 2. In the open state OS, the connection device 8 permits relative movements between the subframe 5 and the chassis 2 so that the subframe 5 is movably connected to the chassis 2. In the closed state CS, the connection device 8 does not permit, and/or prevents, relative movements between the subframe 5 and the chassis 2, whereby the subframe 5 is rigidly connected to the chassis 2.

The vehicle 1 has a vehicle interior 9 in which at least one vehicle seat 19 is provided for a driver 10 and/or for a passenger 10. The driver 10 and/or passenger 10 is symbolized merely by an ear in FIGS. 1 and 2. The vehicle 1 can also be equipped with an acoustic noise attenuation device 11, which attenuates driving sounds of the motor vehicle 1, in particular wheel rolling sounds, by means of antinoise or active noise reduction. With the motor vehicle 1 traveling, the wheels 4 rolling on the roadway 18 generate wheel rolling sounds, which are transmitted as body sound from the vehicle wheels 4 via the single-wheel suspension 6 to the subframe 5 and from the subframe 5 to the chassis 2. From the chassis 2, the wheel rolling sounds are transmitted as airborne sound into the vehicle interior 9 and there are perceived by the respective driver 10 and/or passenger 10.

The vehicle 1 can be equipped with a control device 12, which is coupled to the connection device 8 and to the noise attenuation device 11 in a suitable manner, for example via control lines (not shown here). The control device 12 can also be configured to switch on the noise attenuation device 11 when the connection device 8 is switched into the closed state SZ. The controller 12 can suitably also be configured to switch off the noise attenuation device 11 when the connection device 8 is switched into the open state OZ. The control device may be a computer comprising a controller, transmitter, receiver, memory, etc. and capable of executing a computer program.

For example, the driver can cause the switch-over of the connection device 8 into the closed state CS by selecting a sports operation mode. For example, the switch-over into the open state OS occurs by means of the selection by the driver of a standard operating state. By means of the selection of a comfort operating state, it can, in particular, be possible to selectively switch on the noise attenuation device 11 even in the open state OS of the connection device 8.

The connection device 8 can be configured as a locking device 13, which comprises at least one latch 14, which is adjustable by means of a latch actuating device 15 between a locking position LP shown in FIG. 2 and an unlocking position UP shown in FIG. 1. In the closed state CS, the respective latch 14 assumes its locking position LP, wherein the respective latch 14 engages in a latch receptacle 16 which is complementary to said latch. By means of the mechanical engagement of the respective latch 14 in the associated latch receptacle 16, a positive locking connection is generated that rigidly connects the subframe 5 to the chassis 2. In the open state OS, the respective latch 14 assumes its unlocking position UP, wherein the respective latch 14 is moved out of the associated latch receptacle 16 and/or is free therefrom. As a result, the subframe 5 is movable relative to the chassis 2. In the example shown here, the respective latch 14 is arranged adjustably on the subframe 5 between the locking position LP and the unlocking position UP, whereas the associated latch receptacle 16 is arranged fixedly on the chassis 2. In an alternative design, this can also be reversed so that the respective latch 14 is then adjustably arranged on the chassis 2, while the associated latch receptacle 16 is then fixedly arranged on the subframe 5.

The bearing device 7 can suitably comprise multiple elastokinematic bearings 17, which are indicated in FIGS. 1 and 2 in a highly simplified manner by spring symbols. It is clear that such elastokinematic bearings 17 can have a relatively complex construction in order, firstly, to be able to transfer the relatively large forces and, secondly, to be able to provide the desired elastic connection between the subframe 5 and the chassis 2. Each of these bearings 17 elastically connects the subframe 5 to the chassis 2. The locking device 13 can now comprise multiple latches 14. The number of latches 14 suitably corresponds to the number of bearings 17. Accordingly, exactly one bearing 17 can be associated with each latch 14. The respective bearing 17 then comprises the latch receptacle 16 associated with the respective latch 14. As a result, in the locking position LP, the respective latch 14 engages in the latch receptacle 16 of the associated bearing 17 and thereby blocks the associated bearing 17. The blocked bearing 17 now leads to a rigid connection between the subframe 5 and the chassis 2. If, however, the respective latch 14 is displaced into the unlocking position UP, it is moved out of the latch receptacle 16 and releases the associated bearing 17 so that it functions properly and elastically connects the subframe 5 to the chassis 2.

The connection device 8 can operate, in principle, mechanically and/or hydraulically and/or pneumatically and/or magnetically and/or electrically to bring about the open state OS and the closed state CS. The respective latch actuating device 15 can operate electrically or hydraulically or pneumatically to displace the respective latch 14.

The connection device 8 can suitably be integrated into the bearing device 7. As a result, the bearing device 7 can be switched between an elastic bearing device state eBDS and a rigid bearing device state rBDS. The elastic bearing device state eBDS then forms the open state OS of the connection device, as is shown in FIG. 1. In the elastic bearing device state eBDS, the bearing device 7 elastically connects the subframe 5 to the chassis 2 and thus permits relative movements between the subframe 5 and the chassis 2. The rigid bearing device state rBDS forms the closed state CS of the connection device 8, as is shown in FIG. 2. In the rigid bearing device state rBDS, the bearing device 7 rigidly connects the subframe 5 to the chassis 2 and thereby prevents relative movements between the subframe 5 and the chassis 2. This functionality of the connection device 8 is suitably integrated into the individual bearings 17 of the bearing device 7. Accordingly, the bearings 17 can be switched over between an elastic bearing state eBS and a rigid bearing state rBS. In the elastic bearing state eBS, which is illustrated in FIG. 1, the respective bearing 17 elastically connects the subframe 5 to the chassis 2 and thereby permits relative movements between the subframe 5 and the chassis 2. In the rigid bearing state rBS, which is illustrated in FIG. 2, the respective bearing 17 rigidly connects the subframe 5 to the chassis 2 and thereby prevents relative movements between the subframe 5 and the chassis 2. If now the bearings 17 are switched into their elastic bearing state eBS, for example, with the aid of the control means 12, the bearing device 7 assumes its elastic bearing device state eBDS, which represents the open state OS for the connection device 8. By contrast, if the bearings 17 are switched into the rigid bearing state rBS, the bearing device 7 assumes its rigid bearing device state rBDS, which then represents the closed state CS of the connection device 8.

The use of bearings 17 that operate with an electrorheological liquid is, for example, conceivable. An electrical field can then be used to adjust the elasticity and/or the hardness of the respective bearing 17. For example, by means of suitable electrical fields, the elastic bearing state eBS for the bearings 17 and thus the open state OS for the connection device 8 and the rigid bearing state rBS for the bearings 17 and thus the closed state CS for the connection device 8 can be adjusted.

What is claimed is:

1. A motor vehicle comprising:
    a chassis having at least two axles, each axle having at least two vehicle wheels forming a front axle with at least two front wheels and a rear axle with at least two rear wheels,
    at least one subframe, which is associated with one of the axles, and is connected to the chassis and on which the at least two wheels of the respective axle are each supported and held by way of a single-wheel suspension,
    at least one bearing device for elastically connecting the subframe to the chassis, which at least one bearing device permits relative movements between the subframe and the chassis, and
    at least one connection device for rigidly connecting the subframe to the chassis, which at least one connection device is switchable between an open state (OS) in which the connection device permits relative movements between the subframe and the chassis, and a closed state (CS) in which the connection device prevents relative movements between the subframe and the chassis.

2. The motor vehicle according to claim 1, wherein the connection device is configured as a locking device which has at least one latch which is adjustable by way of a latch actuating device between a locking position (LP) and an unlocking position (UP),
    wherein in the closed state (CS), the respective latch assumes the locking position (LP), in which the respective latch engages in a latch receptacle which is complementary thereto and thereby generates a positive locking connection, which rigidly connects the subframe to the chassis, and
    wherein in the open state (OS), the respective latch assumes the unlocking position (UP), in which the respective latch is moved out of the associated latch receptacle, such that the subframe is movable relative to the chassis.

3. The motor vehicle according to claim 2, wherein (i) the respective latch is arranged adjustably on the subframe, while the associated latch receptacle is arranged fixedly on the chassis, or (ii) the respective latch is arranged adjustably on the chassis, while the associated latch receptacle is arranged fixedly on the subframe.

4. The motor vehicle according to claim 2, wherein the bearing device comprises multiple elastokinematic bearings, each of which elastically connects the subframe to the chassis,
    wherein the locking device has multiple latches, wherein each latch of the multiple latches is associated with a respective elastokinematic bearing which has the respective latch receptacle,
    wherein the respective latch engages in the latch receptacle in the locking position and blocks the associated bearing so that the respective latch rigidly connects the subframe to the chassis, and
    wherein in the unlocking position, the respective latch is moved out of the latch receptacle and releases the associated bearing so that the respective latch elastically connects the subframe to the chassis.

5. The motor vehicle according to claim 1, wherein the bearing device comprises multiple elastokinematic bearings, each of which elastically connects the subframe to the chassis.

6. The motor vehicle according to claim 1, wherein the connection device operates mechanically and/or hydraulically and/or pneumatically and/or magnetically and/or electrically.

7. The motor vehicle according to claim 1,
    wherein the connection device is integrated into the bearing device, such that the bearing device is switchable between an elastic bearing device state (eBDS) and a rigid bearing device state (rBDS),
    wherein the elastic bearing device state (eBDS) forms the open state (OS) of the connection device in which the bearing device elastically connects the subframe to the chassis and permits relative movements between the subframe and the chassis, wherein the rigid bearing device state (rBDS) forms the closed state (CS) of the connection device in which the bearing device rigidly connects the subframe to the chassis and prevents relative movements between the subframe and the chassis.

8. The motor vehicle according to claim 7, wherein the bearing device has multiple bearings which are each switchable at least between an elastic bearing state (eBS) in which the respective bearing elastically connects the subframe to the chassis and permits relative movements between the subframe and the chassis, and a rigid bearing state (rBS) in which the respective bearing rigidly connects the subframe to the chassis and prevents relative movements between the subframe and the chassis, wherein the bearing device assumes the elastic bearing device state (eBDS) when the bearings are switched into the elastic bearing state (eBS), and wherein the bearing device assumes the rigid bearing device state (rBDS) when the bearings are switched into the rigid bearing state (rBS).

9. A motor vehicle comprising:

a chassis having at least two axles, each axle having at least two vehicle wheels forming a front axle with at least two front wheels and a rear axle with at least two rear wheels, at least one subframe, which is associated with one of the axles, and is connected to the chassis and on which the at least two wheels of the respective axle are each supported and held by way of a single-wheel suspension, at least one bearing device for elastically connecting the subframe to the chassis, which at least one bearing device permits relative movements between the subframe and the chassis, and at least one connection device for rigidly connecting the subframe to the chassis, which at least one connection device is switchable between an open state (OS) in which the connection device permits relative movements between the subframe and the chassis, and a closed state (CS) in which the connection device prevents relative movements between the subframe and the chassis, wherein (i) the motor vehicle has a vehicle interior in which at least one vehicle seat is located for a driver and/or for a passenger, and (ii) the motor vehicle has an acoustic noise attenuation device which is configured to dampen driving sounds of the motor vehicle in the vehicle interior by way of anti-noise.

10. The motor vehicle according to claim 9, wherein the motor vehicle has a control device which is coupled to the connection device and to the noise attenuation device and is configured to activate the acoustic noise attenuation device when the connection device is switched to the closed state (CS) and deactivate the acoustic noise attenuation device when the connection device is switched to the open state (OS).

* * * * *